United States Patent
Huang

(10) Patent No.: US 9,345,108 B2
(45) Date of Patent: *May 17, 2016

(54) SELF-ADAPTIVE BRIGHTNESS SENSOR LIGHT, BRIGHTNESS SENSOR MODULE, AND BRIGHTNESS-ADJUSTING METHOD OF THE SAME

(71) Applicant: IR-TEC INTERNATIONAL LTD., Luzhu Township (TW)

(72) Inventor: Wen-I Huang, Luzhu Township (TW)

(73) Assignee: IR-TEC INTERNATIONAL LTD., Taoyuan County (TW)

( * ) Notice: Subject to any disclaimer, the term of this patent is extended or adjusted under 35 U.S.C. 154(b) by 127 days.

This patent is subject to a terminal disclaimer.

(21) Appl. No.: 14/167,180

(22) Filed: Jan. 29, 2014

(65) Prior Publication Data

US 2015/0216015 A1 Jul. 30, 2015

(51) Int. Cl.
*G05F 1/00* (2006.01)
*H05B 37/02* (2006.01)

(52) U.S. Cl.
CPC ................. *H05B 37/0218* (2013.01)

(58) Field of Classification Search
CPC ................. H05B 33/02; H05B 33/08
USPC ........ 315/291, 307, 294, 295, 185 R
See application file for complete search history.

(56) References Cited

U.S. PATENT DOCUMENTS

2013/0342131 A1* 12/2013 Recker et al. ............ 315/292

* cited by examiner

*Primary Examiner* — Minh D A
(74) *Attorney, Agent, or Firm* — Tracy M. Heims; Apex Jurls, pllc

(57) ABSTRACT

A self-adaptive brightness sensor light performs a brightness level adjusting procedure upon activating a lamp body thereof. The brightness level adjusting procedure has steps of acquiring an ambient brightness level, determining if the ambient brightness level is greater than a daytime bright level, and if positive, generating a new daytime brightness level to make it greater than the ambient brightness level, and deactivating the lamp body according to the new daytime brightness level. The daytime brightness level can be automatically adjusted after the lamp body is activated, so as to avoid repeated on-and-off condition of the sensor lights that occur due to immediate deactivation of the sensor light after the sensor light is turned on.

20 Claims, 9 Drawing Sheets

SELF-ADAPTIVE BRIGHTNESS SENSOR LIGHT, BRIGHTNESS SENSOR MODULE, AND BRIGHTNESS-ADJUSTING METHOD OF THE SAME

BACKGROUND OF THE INVENTION

1. Field of the Invention

The present invention relates to a sensor light, a brightness sensor module, and a brightness-adjusting method embedded in the brightness sensor module, and more particularly to a self-adaptive brightness sensor light and a brightness sensor module and a brightness-adjusting method thereof.

2. Description of the Related Art

Rapid technological progress has gradually embodied the concept of intelligent building, and sensor lights rank as the most widespread products among all products used in the intelligent buildings.

Sensor lights usually have sensors installed therein and use the sensors to turn on and turn off the light. A conventional sensor light has a brightness sensor module that turns on and turns off the sensor light according to an ambient brightness measured by the brightness sensor module, and automatically turns on the sensor light during the nighttime and turns off the sensor light during the daytime. Accordingly, the conventional sensor light achieves not only convenient operation but also energy economics.

The brightness sensor module of the conventional sensor light is built in with a daytime brightness level, a nighttime brightness level and a control procedure for turning on and off the sensor light. The control procedure has the following steps.

Detect brightness of an ambient environment to acquire an ambient brightness value.

Compare the ambient brightness value with the daytime brightness level and the nighttime brightness level and turn on or turn off the sensor light according to the comparison result. When the ambient brightness value is less than the nighttime brightness level, the sensor light is turned on. When the ambient brightness value is greater than the daytime brightness level, the sensor light is turned off.

Although the sensor light can be automatically turned on/off when the ambient brightness value is lower/higher than the daytime brightness level (a nighttime case), the sensor light has its flaw in operation. If the mounting environment of the sensor light has high reflectance, such as a white wall, an adjacent mirror or the like, after being turned on, the sensor light is immediately turned off upon detecting that the ambient brightness value is higher than the daytime brightness level, and after being turned off, the sensor light is turned on again upon detecting that the ambient brightness value is lower than the nighttime brightness level. The sensor light is repeatedly on and off and operational trouble therefore arises.

SUMMARY OF THE INVENTION

An objective of the present invention is to provide a self-adaptive brightness sensor light, a brightness sensor module, and a brightness-adjusting method thereof capable of eliminating repeated on-and-off issue of sensor lights.

To achieve the foregoing objective, the self-adaptive brightness sensor light has a lamp body and a control circuit.

The control circuit is mounted inside the lamp body and has a power supply module and a brightness sensor module.

The power supply module is connected to the lamp body.

The brightness sensor module is connected to the power supply module, activates or deactivates the power supply module to turn on or turn off the lamp body, and has a daytime brightness level (day_level) and a brightness level adjusting procedure.

The day_level is predetermined in the brightness sensor module.

The brightness level adjusting procedure is built in the brightness sensor module, is performed by the brightness sensor module, and has steps of:

detecting brightness of an ambient environment to acquire an ambient brightness value after the lamp body is turned on ($Lux_{on}$);

determining if the $Lux_{on}$ is greater than the day_level, and if positive, generating a new daytime brightness level (day_level_new) being greater than the $Lux_{on}$; and determining whether the lamp body should be deactivated according to the day_level_new.

To achieve the foregoing objective, the self-adaptive brightness-adjusting method has steps of:

presetting a daytime brightness level (day_level);

activating an external lamp body;

detecting brightness of an ambient environment to acquire an ambient brightness value after the lamp body is turned on ($Lux_{on}$);

determining if the $Lux_{on}$ is greater than the day_level, and if positive, generating a new daytime brightness level (day_level_new) being greater than the $Lux_{on}$; and determining whether to deactivate the lamp body according to the day_level_new.

As the brightness sensor module of the foregoing brightness sensor light performs the brightness level adjusting procedure after the lamp body is turned on, the brightness sensor module detects the brightness of the ambient environment after the lamp body is turned on, and reconfigures the daytime brightness level so that the daytime brightness level is greater than the brightness of the ambient environment when the lamp body is turned on. Hence, if the self-adaptive brightness sensor light is mounted in an environment with high reflectance, after the self-adaptive brightness sensor light is turned on, the brightness level adjusting procedure automatically increases the daytime brightness level and the self-adaptive brightness sensor light is not turned off due to the high-brightness reflectance. Accordingly, the repeated on-and-off condition occurring to sensor lights can be avoided.

Other objectives, advantages and novel features of the invention will become more apparent from the following detailed description when taken in conjunction with the accompanying drawings.

DETAILED DESCRIPTION OF THE INVENTION

Figure 1:
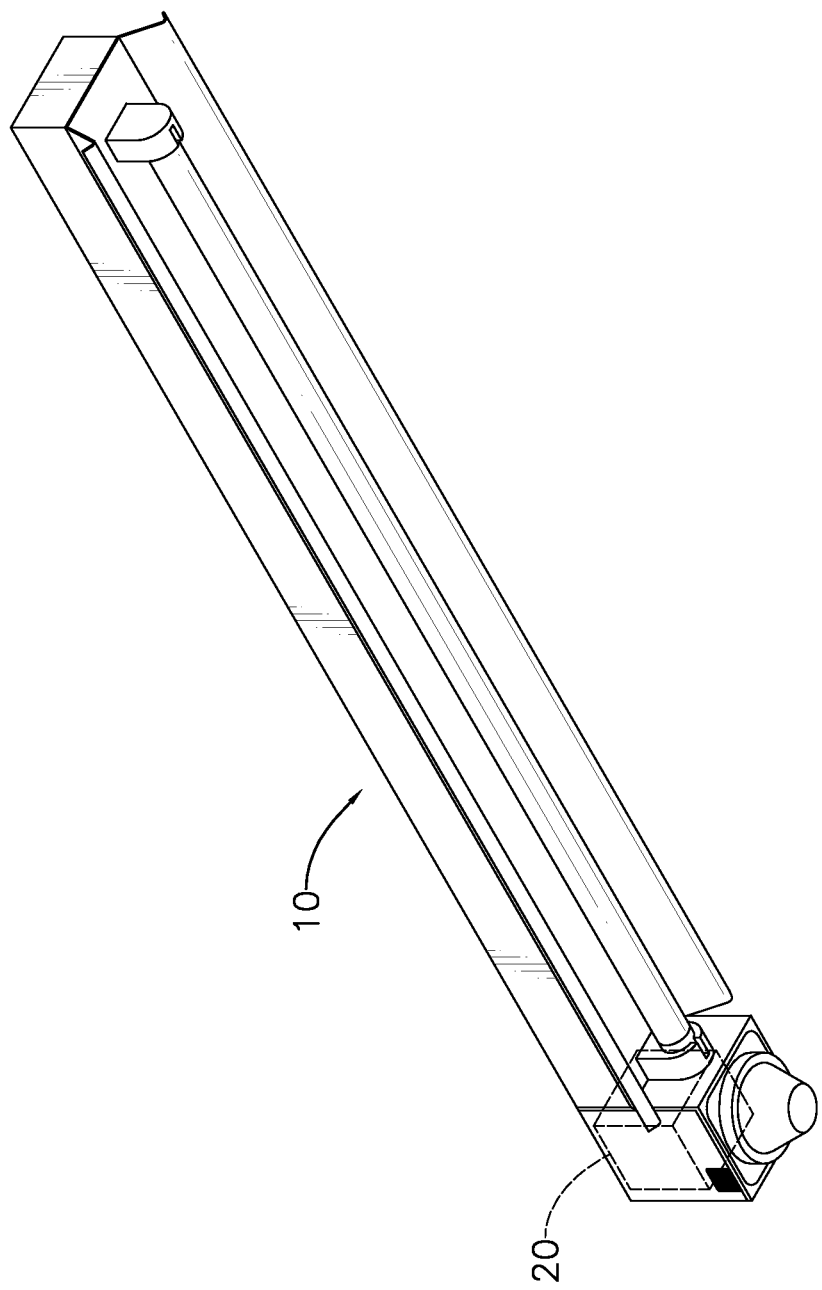
FIG. 1 is a perspective view of a self-adaptive brightness sensor light in accordance with the present invention.
Figure 2:
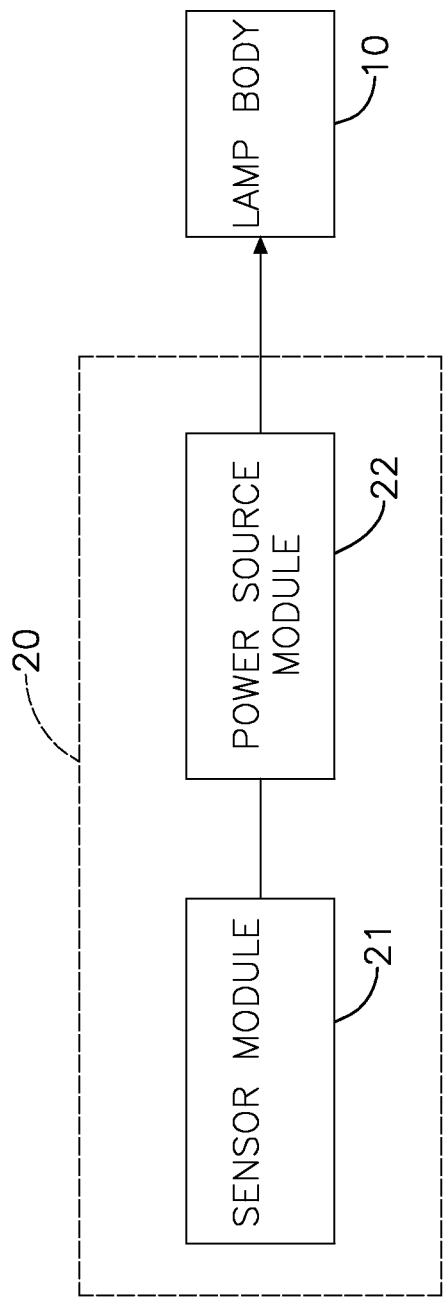
FIG. 2 is a functional block diagram of the self-adaptive brightness sensor light in FIG. 1.

With reference to FIGS. 1 and 2, a self-adaptive brightness sensor light has a lamp body 10 and a control circuit 20. The control circuit 20 has a brightness sensor module 21 and a power supply module 22. The power supply module 22 is connected to the lamp body 10. The brightness sensor module 21 is connected to the power supply module 22 and activates or deactivates the power supply module 22 to turn on or turn off the lamp body 10.

Figure 3:
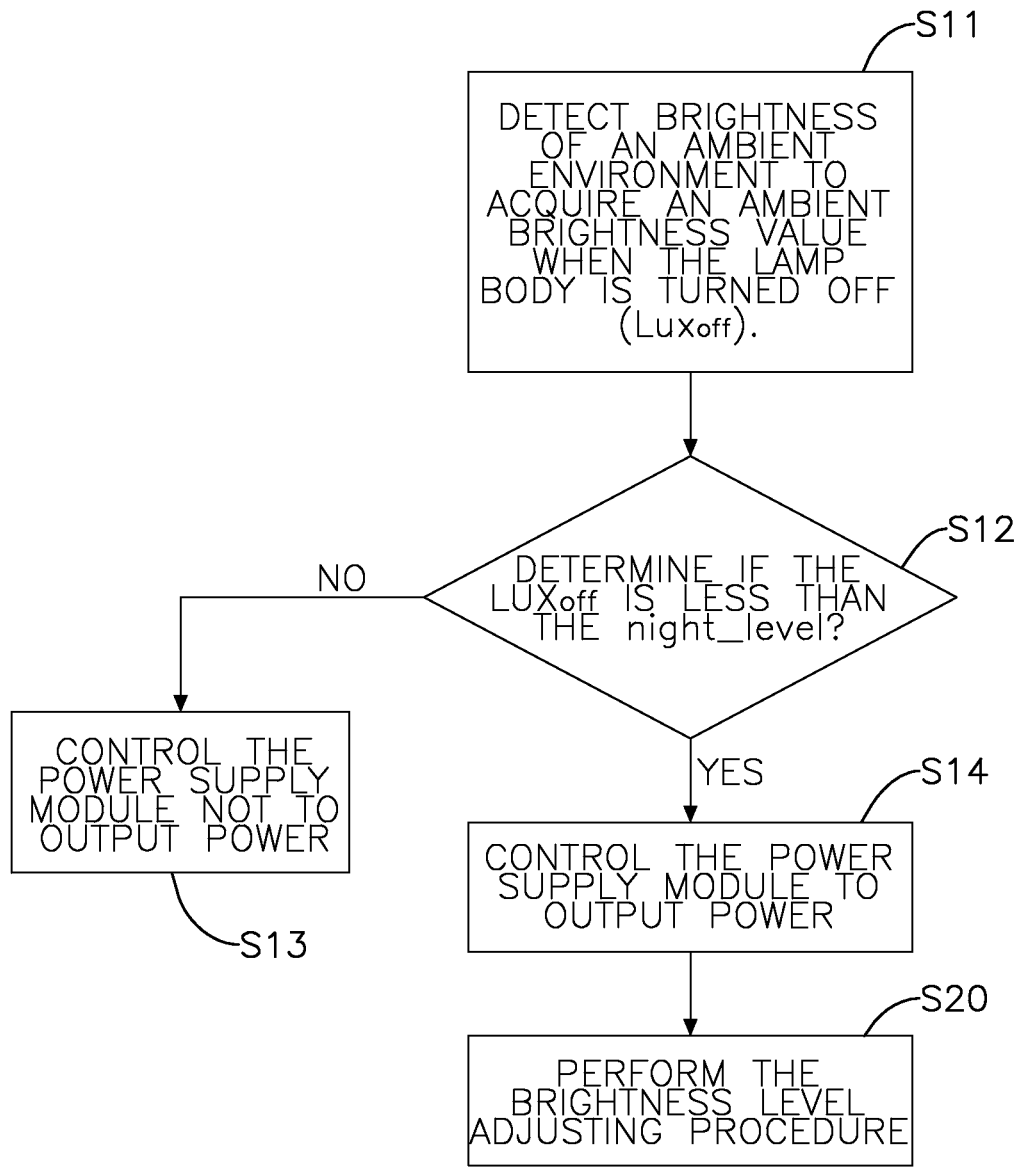
FIG. 3 is a flow diagram of an activation determination procedure embedded in a brightness sensor module in FIG. 2.

The brightness sensor module 21 has a daytime brightness level (day_level) and a nighttime brightness level (night_level) predetermined in the brightness sensor module 21, and is built in with an activation determination procedure, a brightness level adjusting procedure, a calibration procedure and a deactivation determination procedure. With reference to FIG. 3, the activation determination procedure has the following steps.

Step S11: Detect brightness of an ambient environment to acquire an ambient brightness value when the lamp body 10 is turned off ($Lux_{off}$).

Step S12: Determine if the $Lux_{off}$ is lower than the night_level. If negative, perform step S13. Otherwise, perform steps S14 and S20.

Step S13: Control the power supply module 22 not to output power so as not to turn on the lamp body 10.

Step S14: Control the power supply module 22 to output power so as to turn on the lamp body 10.

Step S20: Perform the brightness level adjusting procedure.

Figure 4:
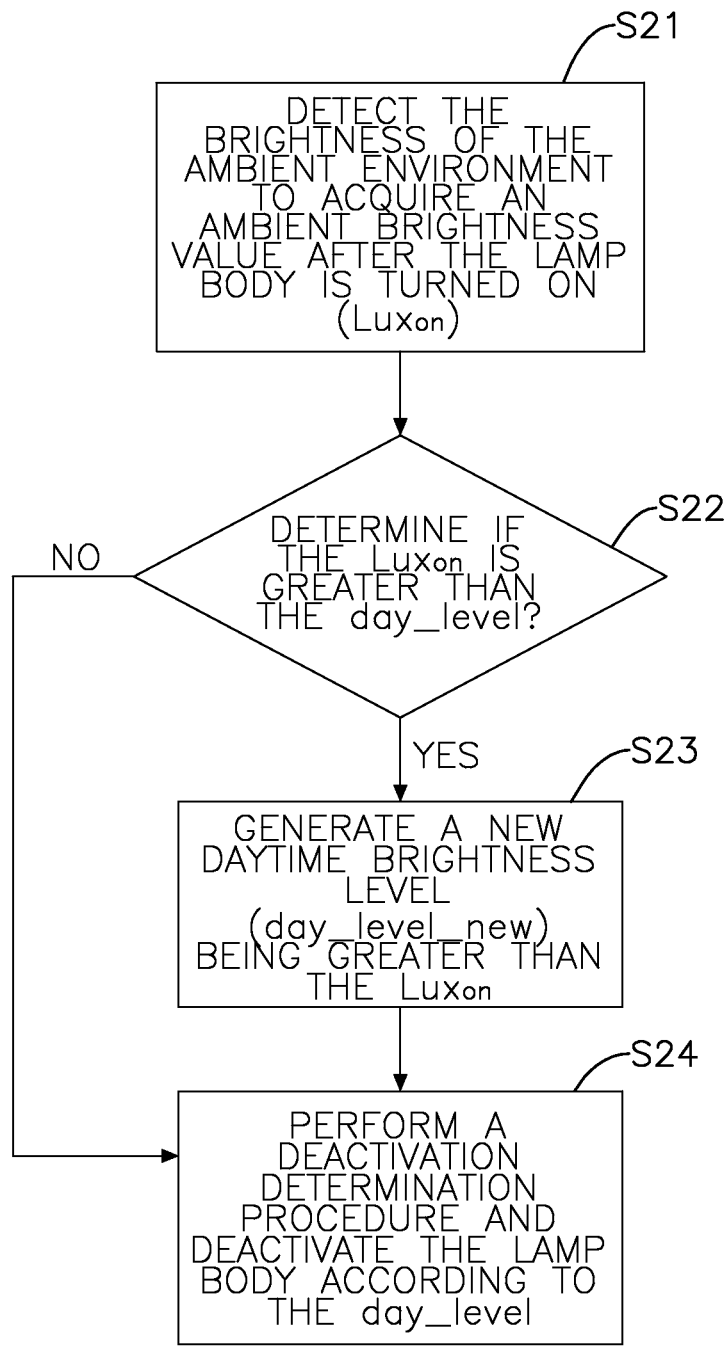
FIG. 4 is a flow diagram of a brightness level adjusting procedure embedded in the brightness sensor module in FIG. 2.

With reference to FIG. 4, the brightness level adjusting procedure has the following steps.

Step S21: Detect the brightness of the ambient environment to acquire an ambient brightness value after the lamp body 10 is turned on ($Lux_{on}$). In the present embodiment, the brightness sensor module acquires the $Lux_{on}$ after constantly detecting the brightness of the ambient environment for a period of detection time (such as 5 to 10 seconds, normally a time required to detect a stable brightness level) to ensure acquisition of a more accurate $Lux_{on}$.

Step S22: Determine if the $Lux_{on}$ is greater than the day_level. If positive, perform steps S23 and S24. If negative, perform step S24.

Step S23: Generate a new daytime brightness level (day_level_new) being greater than the $Lux_{on}$.

Step S24 Perform the deactivation determination procedure and deactivate the lamp body 10 according to the day_level.

Figure 5:
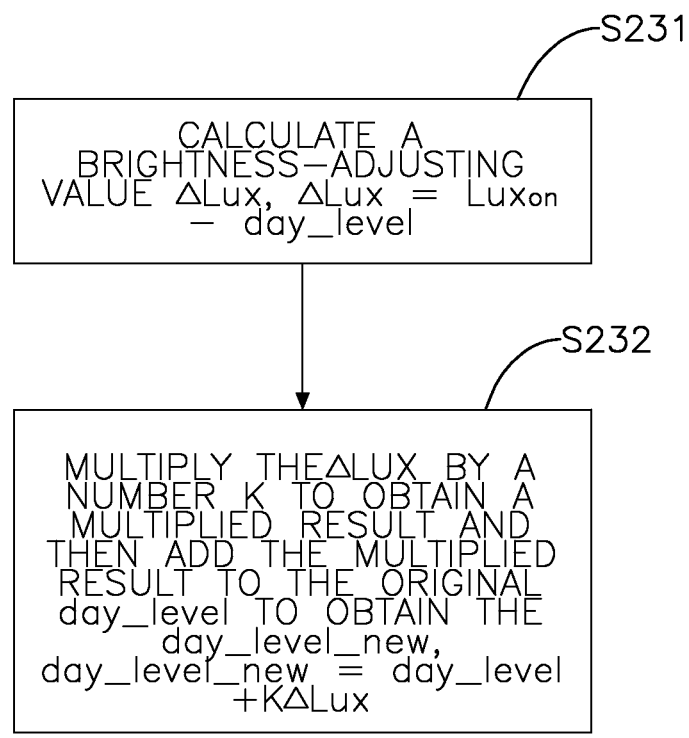
FIG. 5 is a flow diagram of steps of the brightness level adjusting procedure in FIG. 4 for reconfiguring a daytime brightness level.
Figure 6:
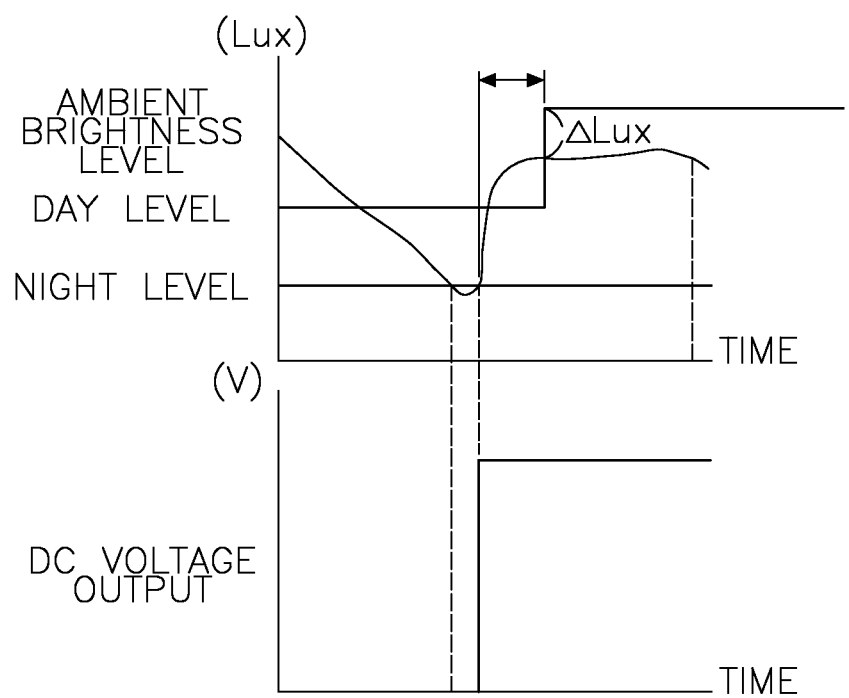
FIG. 6 is a graph showing a curve illustrating the daytime brightness level varying with time.

With reference to FIGS. 5 and 6, to further describe step S23 for reconfiguring the day_level in details, step S23 further has the following steps.

Step S231: Calculate a brightness-adjusting value ΔLux, which is equal to a difference between the $Lux_{on}$ and the day_level, that is, $\Delta Lux = Lux_{on} - day\_level$.

Step S232: Multiply the ΔLux by a number K to obtain a multiplied result and then add the multiplied result to the original day_level to obtain the day_level_new, that is, day_level_new=day_level+KΔLux. The number K is preferably in a range of 0.1~3.

Figure 7:
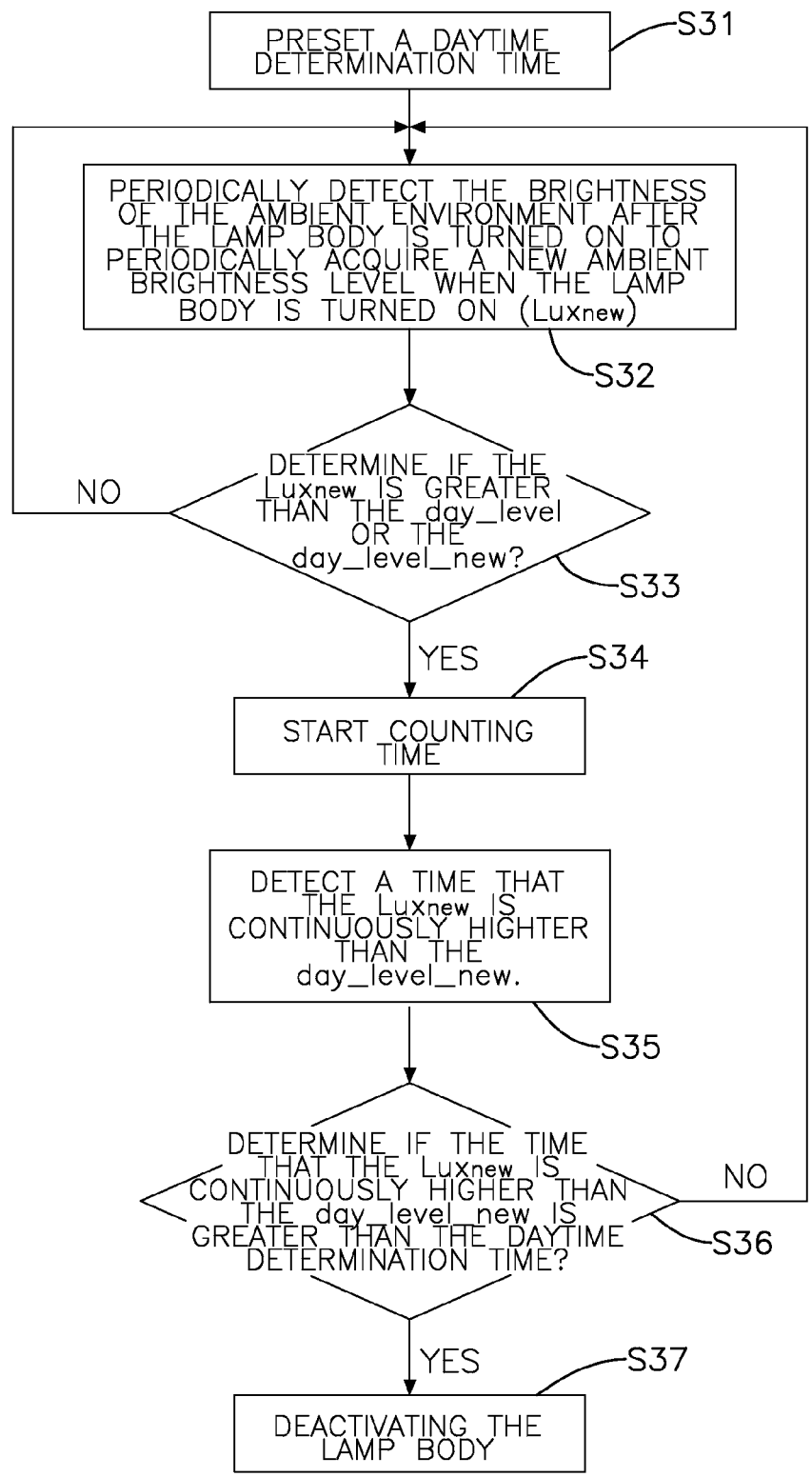
FIG. 7 is a flow diagram of a deactivation determination procedure embedded in the brightness sensor module in FIG. 2.

The foregoing brightness level adjusting procedure targets at increasing the value of day_level and deactivating the lamp holder 10 according to the increased day_level_new. Hence, after the brightness level adjusting procedure is finished, the deactivation determination procedure can then be performed. With reference to FIG. 7, the deactivation determination procedure has the following steps.

Step S31: Preset a daytime determination time, such as 25 seconds.

Step S32: Periodically detect the brightness of the ambient environment after the lamp body 10 is turned on to periodically acquire a new ambient brightness level when the lamp body 10 is turned on ($Lux_{new}$).

Step S33: Determine if the $Lux_{new}$ is greater than the day_level or the day_level_new. If positive, perform step S34. If negative, resume step S32.

Step S34: Start counting time.

Step S35: Detect a time during which the $Lux_{new}$ is continuously higher than the day_level_new.

Step S36: Determine if the time during which the $Lux_{new}$ is continuously higher than the day_level_new is longer than the daytime determination time. If positive, perform step S37 because the ambient environment is determined to be in the daytime. If negative, resume step S32.

Step S37: Stop the power supply module from supplying power and deactivate the lamp body.

Figure 8:
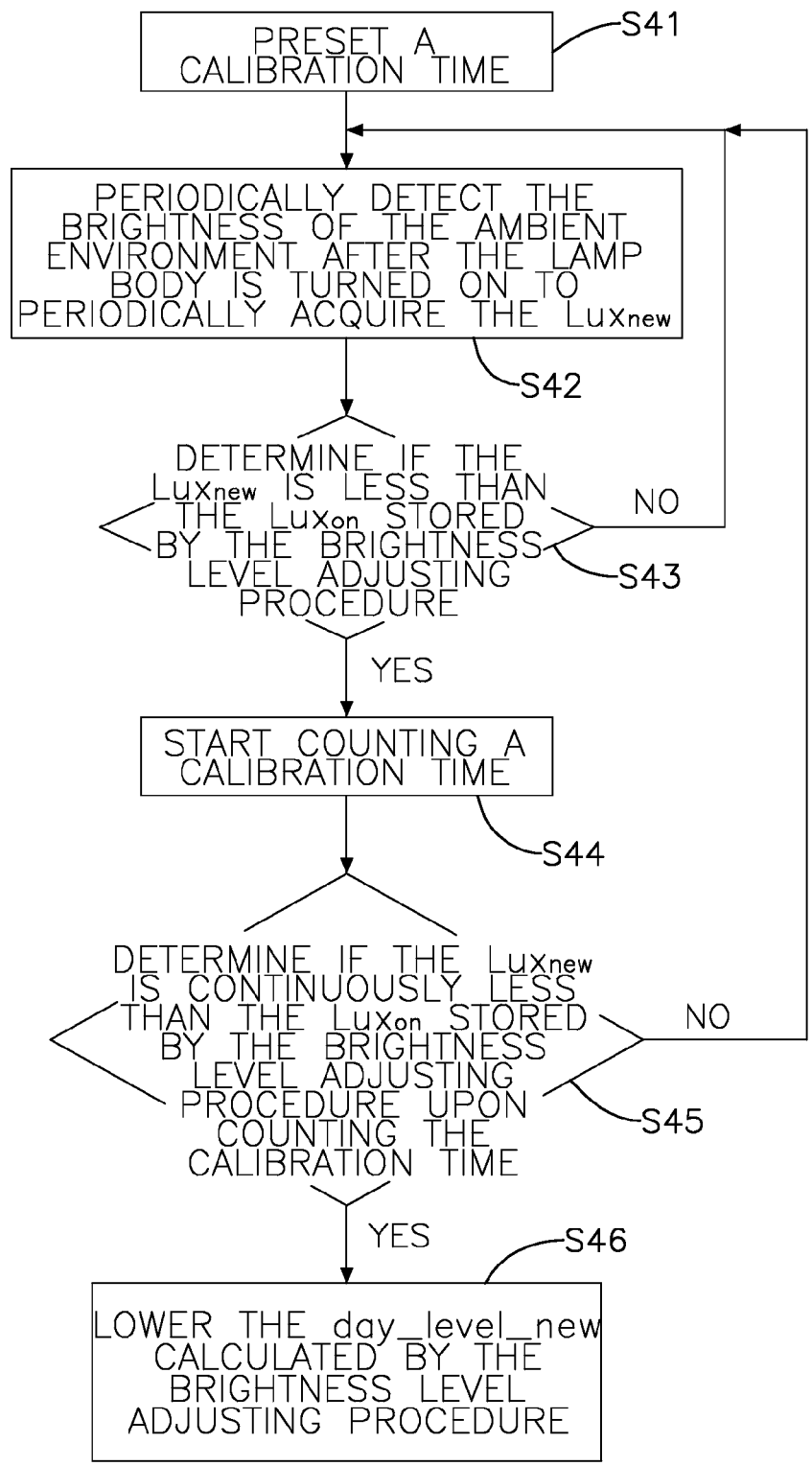
FIG. 8 is a flow diagram of a calibration procedure embedded in the brightness sensor module in FIG. 2.

The foregoing brightness level adjusting procedure targets at adjusting the day_level upon detecting sudden increase of the brightness in the ambient environment when the lamp body 10 is just turned on. As a result, if there is other high-brightness light disturbance at the instant when the lamp body 10 is turned on, the adjusted day_level may be higher than expected and it may not be accurate for the deactivation determination procedure to determine if the ambient environment is in the daytime. To tackle this issue, store the $Lux_{on}$ detected upon performing the brightness level adjusting procedure and perform the calibration procedure in parallel with the execution of the deactivation determination procedure. With reference to FIG. 8, the calibration procedure has the following steps.

Step S41: Preset a calibration time, such as 5 seconds.

Step S42: Periodically detect the brightness of the ambient environment after the lamp body 10 is turned on to periodically acquire the $Lux_{new}$.

Step S43: Determine if the $Lux_{new}$ is lower than the $Lux_{on}$ stored by the brightness level adjusting procedure. If positive, perform step S44. If negative, resume step S42.

Step S44: Start counting a calibration time.

Step S45: Determine if the $Lux_{new}$ is continuously less than the $Lux_{on}$ stored by the brightness level adjusting procedure upon counting the calibration time. If positive, perform step S46. If negative, resume step S42.

Step S46: Lower the day_level_new calculated by the brightness level adjusting procedure.

The foregoing calibration procedure targets at recalculating the day_level_new, which is used to calculate a difference between the $Lux_{new}$ and the day_level taken as a new brightness-adjusting value ΔLux_new. The ΔLux_new is multiplied by the number K and the multiplied result is added to the day_level to replace the day_level_new, that is, day_level_new=day_level+KΔLux_new. As the ΔLux_new is less than the ΔLux, the calibration procedure can lower the day_level_new calculated by the brightness level adjusting procedure.

Figure 9:
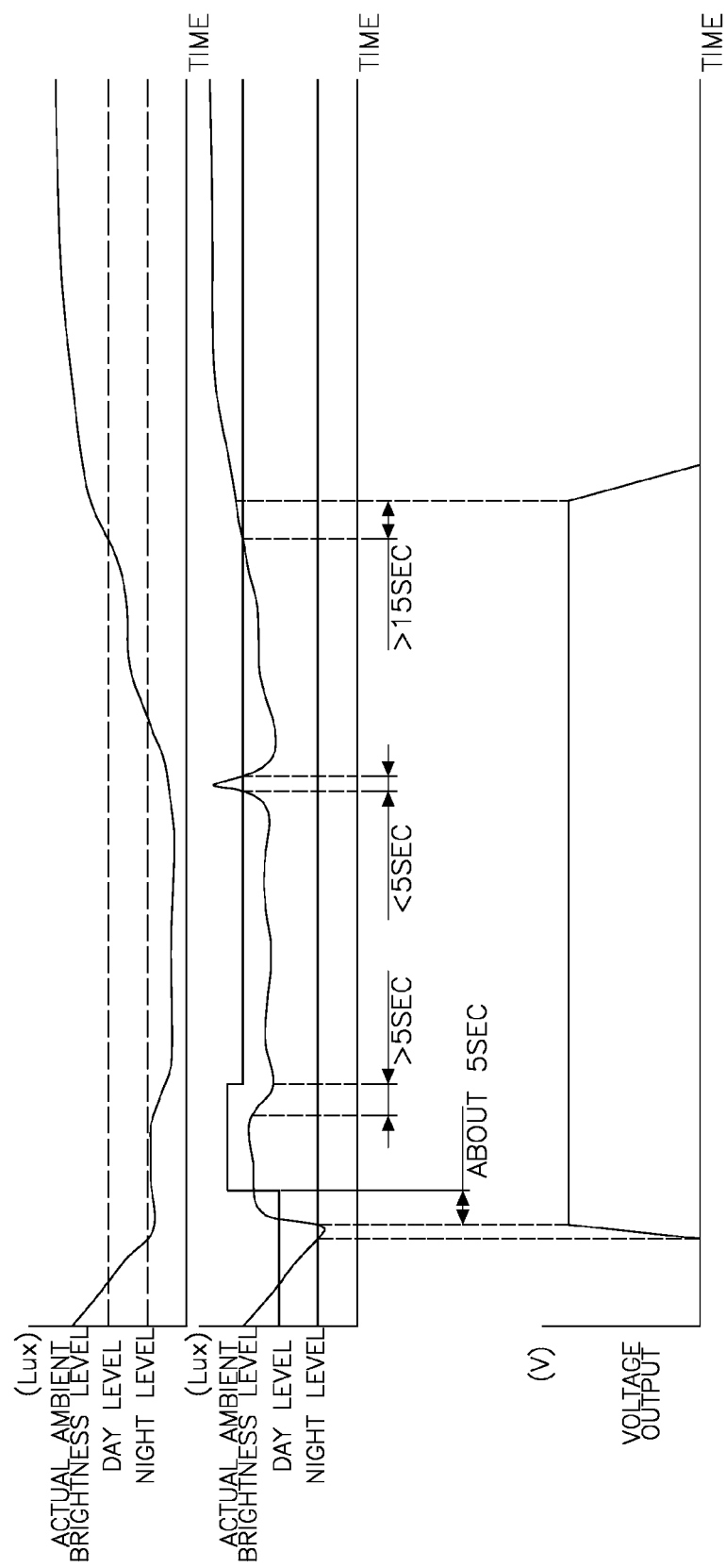
FIG. 9 is a graph showing curves illustrating the detected ambient brightness value and the daytime brightness level and a nighttime brightness level in accordance with the present invention.

With reference to FIG. 9, all conditions that the self-adaptive brightness sensor light encounters are described as follows. Firstly, during dusk the actual ambient brightness level starts decreasing. When the self-adaptive brightness sensor light detects that the ambient brightness level is lower than the night_level, the brightness sensor module 21 controls the power supply module 22 to output power so as to activate the lamp body 10. When the lamp body 10 is activated, the brightness sensor module 21 then starts to perform the brightness level adjusting procedure. Meanwhile, if the $Lux_{on}$ is higher than the day_level after the lamp body 10 is turned on, the brightness sensor module 21 then increases the day_level and activates the lamp body 10 according to the increased day_level_new. Hence, the brightness sensor module 21 will not immediately turn on the lamp body 10 upon performing the deactivation determination procedure. Subsequently, if the brightness level adjusting procedure detects that the time during which the $Lux_{new}$ detected by the calibration procedure is less than the $Lux_{on}$ is long enough, that is, longer than 5 seconds, it indicates that high-brightness light disturbance occurs while the brightness sensor module 21 performs the brightness level adjusting procedure and the calibration procedure then lowers the day_level_new. In the meantime the brightness sensor module 21 performs the deactivation determination procedure. When encountering sudden high-brightness light (the time is shorter than 15 seconds), the brightness sensor module 21 will not turn on the lamp body 10. In the daytime the $Lux_{new}$ starts to increase. Once the $Lux_{new}$ has been continuously greater than the day_level_new for 15 seconds, the brightness sensor module 21 determines that the ambient environment is in the daytime and controls the power supply module 22 not to supply power and to turn off the lamp body 10. Not only can the repeated on-and-off condition of the lamp body 10 arising from excessively high ambient brightness level be prevented when the lamp body 10 is turned on, but also the ambient brightness level over-estimated by the brightness level adjusting procedure because of short-duration and sudden high-brightness light when the lamp body 10 is turned on can be avoided, so as to provide the function of suppressing the short-duration high-brightness light possibly causing misjudgment. Accordingly, the self-adaptive brightness sensor light can reduce the chance of misjudgment arising from short-duration high-brightness light and can turn off the lamp body 10 again in the daytime.

In sum, as being built in with the brightness level adjusting procedure, the brightness sensor module of the self-adaptive brightness sensor light can automatically adjust the daytime brightness level after being turned on, thereby avoiding the repeated on-and-off problem of the self-adaptive brightness sensor light in operation arising from high light reflectance of the ambient environment after the lamp body is turned on.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A self-adaptive brightness sensor light, comprising:
   a lamp body; and
   a control circuit mounted inside the lamp body and having:
      a power supply module connected to the lamp body; and
      a brightness sensor module connected to the power supply module, activating or deactivating the power supply module to turn on or turn off the lamp body, and having:
         a daytime brightness level (day_level) predetermined in the brightness sensor module, and
         a brightness level adjusting procedure built in the brightness sensor module, performed by the brightness sensor module, and having steps of:
            detecting brightness of an ambient environment to acquire an ambient brightness value after the lamp body is turned on ($Lux_{on}$) by the brightness sensor module;
            determining if the $Lux_{on}$ is greater than the day_level, and if positive, generating a new daytime brightness level (day_level_new) being greater than the $Lux_{on}$ by the brightness sensor module; and
            determining whether the lamp body should be deactivated according to the day_level_new by the brightness sensor module.

2. The self-adaptive brightness sensor light as claimed in claim 1, wherein when detecting the brightness of the ambient environment after the lamp body is turned on, the brightness sensor module acquires the $Lux_{on}$ after constantly detecting the brightness of the ambient environment for a period of detection time.

3. The self-adaptive brightness sensor light as claimed in claim 2, wherein when generating the day_level_new, the brightness sensor module calculates a brightness-adjusting value ($\Delta Lux$), which is equal to a difference between the $Lux_{on}$ and the day_level, multiplies the $\Delta Lux$ by a number K to obtain a multiplied result, and then adds the multiplied result to the day_level to obtain the day_level_new.

4. The self-adaptive brightness sensor light as claimed in claim 3, wherein the brightness sensor module further has a deactivation determination procedure built therein, performed by the brightness sensor module after the brightness level adjusting procedure is performed, and having steps of:
   presetting a daytime determination time;
   periodically detecting the brightness of the ambient environment after the lamp body is turned on to periodically acquire a new ambient brightness level when the lamp body is turned on ($Lux_{new}$);
   determining if the $Lux_{new}$ is greater than the day_level_new, if positive, starting counting time and detecting a time during which the $Lux_{new}$ is continuously higher than the day_level_new, and if negative, resuming the step of periodically detecting the brightness of the ambient environment; and
   determining if the time during which the $Lux_{new}$ is continuously higher than the day_level_new is longer than the daytime determination time, if positive, stopping the power supply module from supplying power, and deactivating the lamp body, and if negative, resuming the step of periodically detecting the brightness of the ambient environment.

5. The self-adaptive brightness sensor light as claimed in claim 4, wherein the brightness sensor module further has a calibration procedure built therein, stores the $Lux_{on}$ detected upon performing the brightness level adjusting procedure, and performs the calibration procedure in parallel with execution of the deactivation determination procedure; and the calibration procedure has steps of presetting a daytime determination time;
   periodically detecting the brightness of the ambient environment after the lamp body is turned on to periodically acquire the $Lux_{new}$;
   determining if the $Lux_{new}$ is greater than the day_level_new, if positive, starting counting time, and if negative, resuming the step of periodically detecting the brightness of the ambient environment in the calibration procedure;

detecting a time during which the Luxnew is continuously higher than the day_level_new; and determining if the time during which the Luxnew is continuously higher than the day_level_new is longer than the daytime determination time, if positive, lowering the day_level_new calculated by the brightness level adjusting procedure, and if negative, resuming the step of periodically detecting the brightness of the ambient environment in the calibration procedure.

6. The self-adaptive brightness sensor light as claimed in claim 5, wherein the brightness sensor module further has:

a nighttime brightness level (night_level) predetermined in the brightness sensor module, and an activation determination procedure built in the brightness sensor module, performed by the brightness sensor module, and having steps of:

detecting brightness of an ambient environment to acquire an ambient brightness value when the lamp body is turned off ($Lux_{off}$);

determining if the $Lux_{off}$ is less than the night_level, if negative, controlling the power supply module not to output power so as not to turn on the lamp body, and if positive, controlling the power supply module to output power so as to turn on the lamp body and perform the brightness level adjusting procedure.

7. The self-adaptive brightness sensor light as claimed in claim 2, wherein the brightness sensor module further has a deactivation determination procedure built therein, performed by the brightness sensor module after the brightness level adjusting procedure is performed, and having steps of:

presetting a daytime determination time;

periodically detecting the brightness of the ambient environment after the lamp body is turned on to periodically acquire a new ambient brightness level when the lamp body is turned on ($Lux_{new}$);

determining if the $Lux_{new}$ is greater than the day_level_new, if positive, starting counting time and detecting a time during which the $Lux_{new}$ is continuously higher than the day_level_new, and if negative, resuming the step of periodically detecting the brightness of the ambient environment; and determining if the time during which the $Lux_{new}$ is continuously higher than the day_level_new is longer than the daytime determination time, if positive, stopping the power supply module from supplying power, and deactivating the lamp body, and if negative, resuming the step of periodically detecting the brightness of the ambient environment.

8. A self-adaptive brightness sensor module for activating an external lamp body, comprising:

a daytime brightness level (day_level) predetermined in the self-adaptive brightness sensor module; and a brightness level adjusting procedure built in the self-adaptive brightness sensor module, performed by the self-adaptive brightness sensor module, and having steps of:

detecting brightness of an ambient environment to acquire an ambient brightness value after the lamp body is turned on ($Lux_{on}$) by the self-adaptive brightness sensor module;

determining if the $Lux_{on}$ is greater than the day_level, and if positive, generating a new daytime brightness level (day_level_new) being greater than the $Lux_{on}$ by the self-adaptive brightness sensor module; and determining whether to deactivate the lamp body according to the day_level_new by the self-adaptive brightness sensor module.

9. The self-adaptive brightness sensor module as claimed in claim 8, wherein when detecting the brightness of the ambient environment after the lamp body is turned on, the brightness sensor module acquires the $Lux_{on}$ after constantly detecting the brightness of the ambient environment for a period of detection time.

10. The self-adaptive brightness sensor module as claimed in claim 9, wherein when generating the day_level_new, the brightness sensor module calculates a brightness-adjusting value ($\Delta Lux$), which is equal to a difference between the $Lux_{on}$ and the day_level, multiplies the $\Delta Lux$ by a number K to obtain a multiplied result, and then adds the multiplied result to the day_level to obtain the day_level_new.

11. The self-adaptive brightness sensor module as claimed in claim 10, wherein the brightness sensor module further has a deactivation determination procedure built therein, performed by the brightness sensor module after the brightness level adjusting procedure is performed, and having steps of:

presetting a daytime determination time;

periodically detecting the brightness of the ambient environment after the lamp body is turned on to periodically acquire a new ambient brightness level when the lamp body is turned on ($Lux_{new}$);

determining if the $Lux_{new}$ is greater than the day_level_new, if positive, starting counting time and detecting a time during which the $Lux_{new}$ is continuously higher than the day_level_new, and if negative, resuming the step of periodically detecting the brightness of the ambient environment; and determining if the time during which the $Lux_{new}$ is continuously higher than the day_level_new is longer than the daytime determination time, if positive, stopping the power supply module from supplying power, and deactivating the lamp body, and if negative, resuming the step of periodically detecting the brightness of the ambient environment.

12. The self-adaptive brightness sensor light as claimed in claim 11, wherein the brightness sensor module further has a calibration procedure built therein, stores the $Lux_{on}$ detected upon performing the brightness level adjusting procedure, and performs the calibration procedure in parallel with execution of the deactivation determination procedure; and the calibration procedure has steps of presetting a daytime determination time;

periodically detecting the brightness of the ambient environment after the lamp body is turned on to periodically acquire the $Lux_{new}$;

determining if the $Lux_{new}$ is greater than the day_level_new, if positive, starting counting time, and if negative, resuming the step of periodically detecting the brightness of the ambient environment in the calibration procedure;

detecting a time during which the $Lux_{new}$ is continuously higher than the day_level_new; and determining if the time during which the $Lux_{new}$ is continuously higher than the day_level_new is longer than the daytime determination time, if positive, lowering the day_level_new calculated by the brightness level adjusting procedure, and if negative, resuming the step of periodically detecting the brightness of the ambient environment in the calibration procedure.

13. The self-adaptive brightness sensor light as claimed in claim 12, wherein the brightness sensor module further has:

a nighttime brightness level (night_level) predetermined in the brightness sensor module, and an activation determination procedure built in the brightness sensor module, performed by the brightness sensor module, and having steps of:
    detecting brightness of an ambient environment to acquire an ambient brightness value when the lamp body is turned off ($Lux_{off}$);
    determining if the $Lux_{off}$ is less than the night_level, if negative, controlling the power supply module not to output power so as not to turn on the lamp body, and if positive, controlling the power supply module to output power so as to turn on the lamp body and perform the brightness level adjusting procedure.

14. The self-adaptive brightness sensor module as claimed in claim 9, wherein the brightness sensor module further has a deactivation determination procedure built therein, performed by the brightness sensor module after the brightness level adjusting procedure is performed, and having steps of:
    presetting a daytime determination time;
    periodically detecting the brightness of the ambient environment after the lamp body is turned on to periodically acquire a new ambient brightness level when the lamp body is turned on ($Lux_{new}$);
    determining if the $Lux_{new}$ is greater than the day_level_new, if positive, starting counting time and detecting a time during which the $Lux_{new}$ is continuously higher than the day_level_new, and if negative, resuming the step of periodically detecting the brightness of the ambient environment; and
    determining if the time during which the $Lux_{new}$ is continuously higher than the day_level_new is longer than the daytime determination time, if positive, stopping the power supply module from supplying power, and deactivating the lamp body, and if negative, resuming the step of periodically detecting the brightness of the ambient environment.

15. A self-adaptive brightness-adjusting method, comprising steps of:
    presetting a daytime brightness level (day_level);
    activating an external lamp body;
    detecting brightness of an ambient environment to acquire an ambient brightness value after the lamp body is turned on ($Lux_{on}$) by a brightness sensor module;
    determining if the $Lux_{on}$ is greater than the day_level, and if positive, generating a new daytime brightness level (day_level_new) being greater than the $Lux_{on}$ by the brightness sensor module; and
    determining whether the lamp body should be deactivated according to the day_level_new by the brightness sensor module.

16. The self-adaptive brightness-adjusting method as claimed in claim 15, wherein in the step of detecting the brightness of the ambient environment after activating the lamp body, the $Lux_{on}$ is obtained after the brightness of the ambient environment is constantly detected for a period of detection time.

17. The self-adaptive brightness-adjusting method as claimed in claim 16, wherein in the step of generating the day_level_new, a brightness-adjusting value ($\Delta Lux$), which is equal to a difference between the $Lux_{on}$ and the day_level, is multiplied by a number K first to obtain a multiplied result, and then the multiplied result is added to the day_level to obtain the day_level_new.

18. The self-adaptive brightness-adjusting method as claimed in claim 17, wherein in the step of determining whether to deactivate the lamp body according to the day_level_new, the method further performs a deactivation determination procedure, and the deactivation determination procedure has steps of:
    presetting a daytime determination time;
    periodically detecting the brightness of the ambient environment after the lamp body is turned on to periodically acquire a new ambient brightness level when the lamp body is turned on ($Lux_{new}$);
    determining if the $Lux_{new}$ is greater than the day_level_new, if positive, starting counting time and detecting a time during which the $Lux_{new}$ is continuously higher than the day_level_new, and if negative, resuming the step of periodically detecting the brightness of the ambient environment of the deactivation determination procedure; and
    determining if the time during which the $Lux_{new}$ is continuously higher than the day_level_new is longer than the daytime determination time, if positive, stopping the power supply module from supplying power, and deactivating the lamp body, and if negative, resuming the step of periodically detecting the brightness of the ambient environment of the deactivation determination procedure.

19. The self-adaptive brightness-adjusting method as claimed in claim 18, further comprising steps of storing the $Lux_{on}$ detected upon acquiring the $Lux_{on}$, and performing a calibration procedure in parallel with execution of the deactivation determination procedure, wherein the calibration procedure has steps of
    presetting a daytime determination time;
    periodically detecting the brightness of the ambient environment after the lamp body is turned on to periodically acquire the $Lux_{new}$;
    determining if the $Lux_{new}$ is greater than the day_level_new, if positive, starting counting time, and if negative, resuming the step of periodically detecting the brightness of the ambient environment in the calibration procedure;
    detecting a time during which the $Lux_{new}$ is continuously higher than the day_level_new; and
    determining if the time during which the $Lux_{new}$ is continuously higher than the day_level_new is longer than the daytime determination time, if positive, lowering the day_level_new calculated by the brightness level adjusting procedure, and if negative, resuming the step of periodically detecting the brightness of the ambient environment in the calibration procedure.

20. The self-adaptive brightness-adjusting method as claimed in claim 16, wherein in the step of determining whether to deactivate the lamp body according to the day_level_new, the method further performs a deactivation determination procedure, and the deactivation determination procedure has steps of: presetting a daytime determination time;
    periodically detecting the brightness of the ambient environment after the lamp body is turned on to periodically acquire a new ambient brightness level when the lamp body is turned on ($Lux_{new}$);
    determining if the $Lux_{new}$ is greater than the day_level_new, if positive, starting counting time and detecting a time during which the $Lux_{new}$ is continuously higher than the day_level_new, and if negative, resuming the step of periodically detecting the brightness of the ambient environment of the deactivation determination procedure; and
    determining if the time during which the $Lux_{new}$ is continuously higher than the day_level_new is longer than the daytime determination time, if positive, stopping the power supply module from supplying power, and deactivating the lamp body, and if negative, resuming the step of periodically detecting the brightness of the ambient environment of the deactivation determination procedure.

* * * * *